United States Patent
Niimi et al.

(10) Patent No.: US 7,009,322 B2
(45) Date of Patent: Mar. 7, 2006

(54) ROTOR OF ROTARY ELECTRIC MACHINE AND METHOD OF MANUFACTURING THE ROTOR

(75) Inventors: Masami Niimi, Handa (JP); Tsutomu Shiga, Nukata-gun (JP); Masanori Ohmi, Anjo (JP)

(73) Assignee: Denso Corporation, Kariya (JP)

( * ) Notice: Subject to any disclaimer, the term of this patent is extended or adjusted under 35 U.S.C. 154(b) by 3 days.

(21) Appl. No.: 10/812,069

(22) Filed: Mar. 30, 2004

(65) Prior Publication Data

US 2004/0201304 A1    Oct. 14, 2004

(30) Foreign Application Priority Data

Apr. 11, 2003 (JP) ............................. 2003-107591

(51) Int. Cl.
*H02K 1/00* (2006.01)
(52) U.S. Cl. .................................................. 310/216
(58) Field of Classification Search ......... 310/216–218
See application file for complete search history.

(56) References Cited

U.S. PATENT DOCUMENTS

| 4,102,040 | A | * | 7/1978 | Rich | .......................... 29/598 |
| 4,206,621 | A | * | 6/1980 | Kawasaki et al. | ............ 72/130 |
| 4,894,905 | A | * | 1/1990 | Tanaka et al. | ................ 29/598 |
| 5,489,811 | A |   | 2/1996 | Kern et al. | |
| 5,508,577 | A | * | 4/1996 | Shiga et al. | ................ 310/201 |
| 5,831,366 | A | * | 11/1998 | Kern et al. | .................. 310/216 |

FOREIGN PATENT DOCUMENTS

| EP | 1 410 857 A2 | | 4/2004 | |
| GB | 2030896 A | | 4/1980 | |
| JP | 53-128702 | | 11/1978 | |
| JP | 55-49955 | * | 10/1980 | ................. 310/216 |
| JP | B2 61-11065 | | 4/1986 | |
| JP | A-2-23048 | | 1/1990 | |
| JP | A-7-79551 | | 3/1995 | |
| JP | 2000-78801 | * | 3/2000 | ................. 310/216 |
| JP | 2001-359246 | * | 12/2001 | ................. 310/216 |

* cited by examiner

*Primary Examiner*—Tran Nguyen
(74) *Attorney, Agent, or Firm*—Oliff & Berridge, PLC

(57) ABSTRACT

In a rotor of a rotary electric machine, a rotor core is formed by helically winding a material sheet. The material sheet forms teeth on a first side of a middle connecting portion and projections projecting from a second side of the connecting portion in a direction opposite to the teeth. The material sheet is one of a pair of material sheets formed in a single base sheet in a form of belt. In the base sheet, the material sheets are arranged such that the projections are intermeshed with each other. The material sheet is helically wound such that the projections are located at an inner diameter side of the rotor core.

10 Claims, 4 Drawing Sheets

ROTOR OF ROTARY ELECTRIC MACHINE AND METHOD OF MANUFACTURING THE ROTOR

CROSS REFERENCE TO RELATED APPLICATION

This application is based on Japanese Patent Application No. 2003-107591 filed on Apr. 11, 2003, the disclosure of which is incorporated herein by reference.

FIELD OF THE INVENTION

The present invention relates to a rotor of a rotary electric machine, particularly a rotor of a commutator-type rotary electric machine, and a method of manufacturing the rotor.

BACKGROUND OF THE INVENTION

In recent years, global warming due to an increase in carbon dioxide in the air is one of global environmental issues. Regarding vehicles, it is positively coped with size and weight reductions for an improvement of fuel efficiency. In fact, the amount of use materials is reduced in accordance with an improvement of a yield rate of raw materials for products. With this, the amount of carbon dioxide generated during a manufacturing process of the products can be reduced.

Because the production amount of vehicle parts is large, the generation of the carbon dioxide is largely reduced by coping with the size and weight reduction of the parts and improving the yield rate. For example, in a vehicle starter, which is one of electromagnetic devices, a starter motor is relatively heavy. The size and weight reduction and the improvement of material yield of the starter motor contributes to the reduction of the carbon dioxide. The size and weight reduction of the starter motor has been coped so far. However, it has not been coped sufficiently with the improvement of the yield rate.

In general, a d.c. commutating motor is used for the starter motor. A yield rate of a rotor core is very low in the starter motor. Conventionally, the rotor core is formed by a stack of thin steel sheets. The sheet is produced by stamping a square-shaped steel sheet with a predetermined dimension. When the round-shaped rotor is formed of the square-shaped steel sheet, the yield rate is $\pi/4$. In fact, approximately 40% to 50% of the material is discarded.

For example, Japanese Patent Publication No. JP-B2-61-11065 proposes a manufacturing method of a rotor of a rotary electric machine for improving the yield rate of the sheet. Generally, a stator of the rotary electric machine that has a ring-shaped cross-section, especially, a stator core of a revolving-field type electric machine, is produced by helically winding a sheet in a form of belt. In JP-B2-61-11065, this method is applied to make the rotor core of a rotary electric machine. Specifically, the belt sheet for the rotor core is in a form of comb and has long teeth. The belt sheet is produced from a base metal sheet. In the base metal sheet, two belt sheets are opposed and arranged such that the teeth of a first sheet are intermeshed with the teeth of a second sheet. The rotor core is produced by helically winding one of the first and second sheets.

At the ends of the teeth, notches are formed. The belt sheets are arranged in the base metal sheet such that the teeth are opposed to each other. That is, the notches of the first sheet do not mate with the notches of the second sheet. As a result, the material around the notches is discarded. Therefore, it is difficult to fully reduce scraps of the material. Also, in a belt sheet used for making a core in which side walls of the teeth defining slots are parallel or a core having a large number of slots such as a rotor core of a starter, especially, a magnet type, it is difficult to arrange two belt sheets in the base metal sheet such that the teeth of the first sheet are intermeshed with the teeth of the second sheet.

FIG. 10 shows an example of a base metal sheet for a rotor core of a starter. In the base sheet, two sheets are arranged such that the teeth are opposed to each other. Each sheet is helically wound as shown in FIG. 11. However, the teeth of the first sheet are not intermeshed with the teeth of the second sheet. Therefore, it is difficult to improve a yield rate in this method. Accordingly, the sheets shown in FIG. 10 are not widely used. Also, in the sheet used in JP-B2-61-11065, since the projections formed on the side opposite to the teeth are short, it is difficult to helically wind this sheet.

SUMMARY OF THE INVENTION

The present invention is made in view of the foregoing matters, and it is an object of the present invention to provide a rotor of a rotary electric machine in which a rotor core is constructed of a helically wound sheet, which is easily wound and produced with an enhanced yield rate.

It is another object of the present invention to provide a method of manufacturing a rotor of a rotary electric machine in which a rotor core is easily produced with an enhanced yield rate.

According to a rotor of a rotary electric machine, a rotor core is constructed of a helically wound sheet. The sheet is substantially in a form of belt. The sheet forms teeth extending from a first side of its middle connecting portion in a direction substantially perpendicular to a longitudinal direction of the sheet and projections projecting from a second side of the middle connecting portion in the direction opposite to the teeth. The projections are spaced and defines recesses between them. Each of the teeth has a substantially trapezoidal shape or a substantially rectangular shape. Each of the projections and each of the recesses have substantially the same dimension with respect to a centerline equidistant between a first line passing through the tops of the projections and a second line passing through the bottoms of the recesses. That is, the dimension of the tooth top is equal to the dimension of the tooth base.

The sheet is helically wound in a condition that the projections and recesses are located in a radially inside. Accordingly, a yield rate of the sheet is improved and the sheet is easily wound with a less force.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
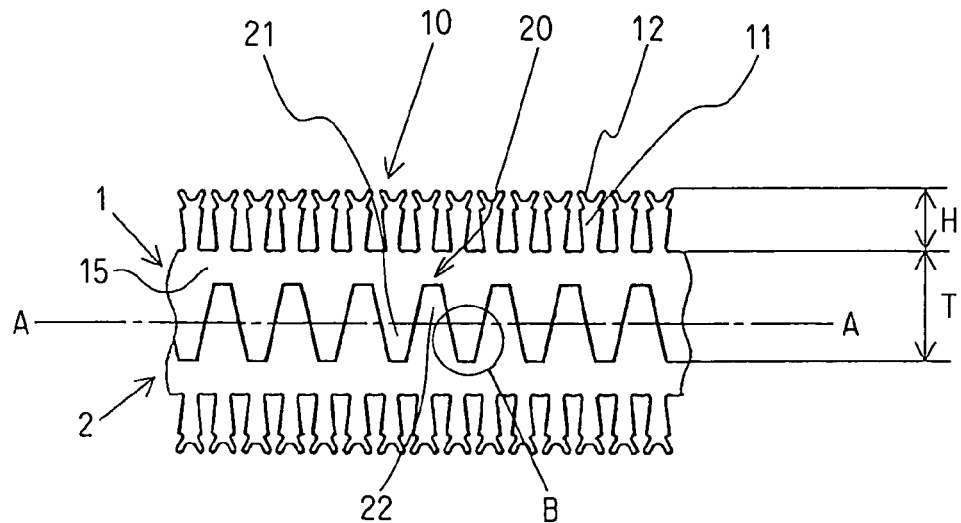
FIG. 1 is a plan view of a base sheet for a rotor core according to a first embodiment of the present invention.

Embodiments of the present invention will be described hereinafter with reference to the drawing.

(First Embodiment)

A rotor core of a rotor of a rotary electric machine of the embodiment is produced by helically winding a material sheet. The material sheet is one of a pair of material sheets 1, 2 included in a base sheet 10 shown in FIG. 1.

Referring to FIG. 1, each of the material sheets 1, 2 has teeth 11, an intermediate connecting portion 15, and fixing projection and recess portions 20. The teeth 11 extend from a first side of the connecting portion 15. Each of the teeth 11 has a substantially trapezoidal shape or a substantially rectangular shape. The tooth 11 has nails 12 at its end for restricting conductors from coming out from the rotor core. The nails 12 are formed into a substantially V-shape with respect to a longitudinal line of the tooth 11 that is coincident with a radial line of the rotor core when the material sheet 1, 2 is wound. The teeth 11 and the connecting portion 15 define magnetic paths in a rotor core.

The projections and recess portions 20 includes a plurality of projections 21. The projections 21 extend in a direction opposite to the teeth 11 from a second side of the connecting portion 15. The projections 21 are spaced in a longitudinal direction of the material sheet 1, 2, so that recesses 22 are formed between the adjacent projections 21.

As shown in FIG. 1, two material sheets 1, 2 are combined in a condition that the projection and recess portions 20 are intermeshed. Further, the projections 21 and the recesses 22 are formed to have the same shapes or dimensions with respect to a centerline A—A. That is, the dimension of a tooth top is substantially the same as the dimension of a tooth base with respect to the centerline A—A. Here, the centerline A—A is equidistant between a first line passing through the tops of the projections 21 and a second line passing through the bottoms of the recesses 22. In the two material sheets 1, 2, the intermeshed portions can be formed to completely mate with each other by a method such as pressing. Alternatively, small gaps can be allowed between the intermeshed portions of the two sheets 1, 2. It is less likely to affect to the present invention. Also, it is not always necessary that the number of teeth 11 is the same as the number of the projections 21 or the recesses 22 in the material sheet 1, 2.

Figure 2:
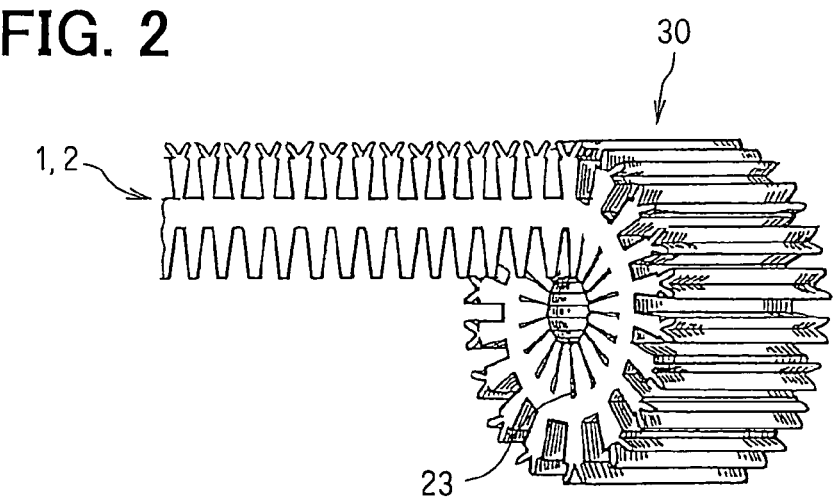
FIG. 2 is a perspective view of the rotor core manufactured by helically winding a material sheet of the base sheet according to the first embodiment of the present invention.

As shown in FIG. 2, the material sheet 1, 2 is helically wound and therefore, the rotor core 30 is produced. The material sheet 1, 2 is wound such that the projections 21 and the recesses 22 are located in a radially inside. In the rotor core 30 shown in FIG. 2, gaps 23 are formed between the projections 21 that are arranged adjacent in a circumferential direction of the rotor core 30.

Here, the material sheets 1, 2 are formed in a single base sheet 10 by stamping such as by pressing. Two material sheets 1, 2 produced from the single base sheet 10 are separated and helically wound. Thus, two separate cores 30 are produced. The material sheet 1, 2 is wound such that the projections 21 are located radially inside and the teeth 11 are located radially outside of the core 30. The teeth 11 forms slots between them on the outer periphery of the core 30.

Figure 3A:
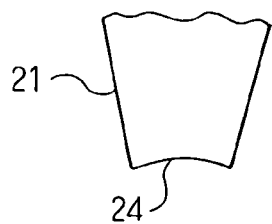
FIG. 3A is a partial enlarged view of an end of a projection of the material sheet according to the first embodiment of the present invention.

As shown in FIG. 3A, each projection 21 forms an arc portion 24 at its top, which is illustrated in a circle B in FIG. 1. The arc portion 24 has a curvature corresponding to a curvature of an outer circumferential surface of a rotor shaft, which is fixed in the radially inside of the rotor core 30. Thus, the arc portions 24 provide a sufficient holding force for holding the rotor shaft inside the rotor core 30.

The teeth 11, the projections 21 and the connecting portion 15 have a following dimensional relation. As shown in FIG. 1, a tooth height H and a total dimension T of the projection 21 and the connecting portion 15 with respect to a direction perpendicular to the longitudinal direction of the material sheet 1, 2 satisfy a relation $2 \times H \leq T$.

Figure 4:
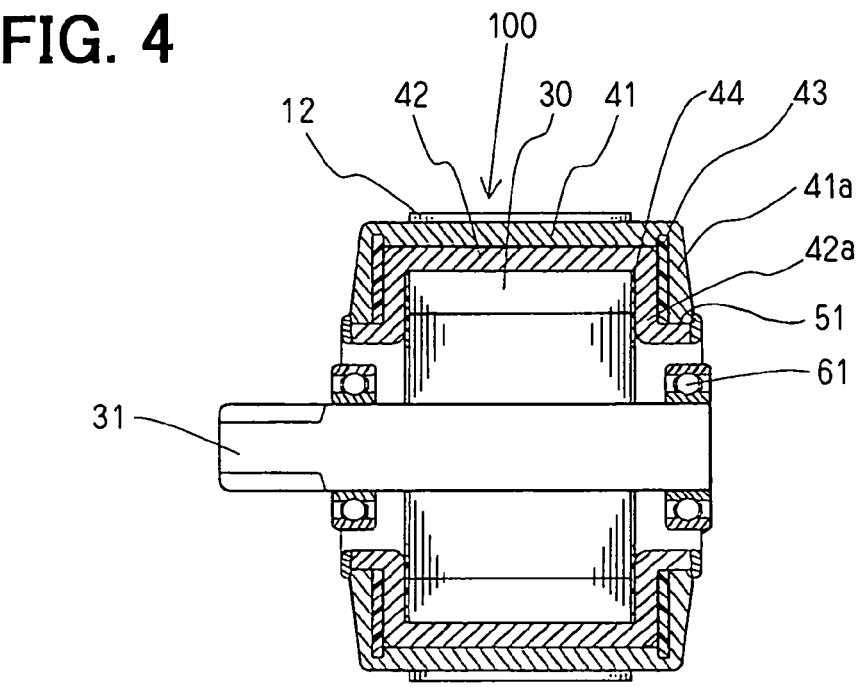
FIG. 4 is a schematic cross-sectional view of a rotor having the rotor core of the first embodiment.

As shown in FIG. 4, the rotor core 30 and the rotor shaft 31 constitute a rotor 100 of a rotary electric machine. A plurality of upper conductors 41 and lower conductors 42 are fixed in the slots formed between the teeth 11 on the radially outside of the rotor core 30. The upper conductors 41 and the lower conductors 42 generally extend in the slots in an axial direction of the rotor 100 and substantially perpendicularly bend at the axial ends of the rotor core 30. Thus, the ends of the upper conductors 41 and the lower conductor 42 form outer conductor portions 41a and inner conductor portions 42a extending in the radial direction of the rotor core 30 along axial end surfaces of the core 30. Further, the outer conductor portions 41a and the lower conductor portions 42a are electrically and mechanically connected at the respective ends 51 located radially inside of the rotor core 30. A first insulating plate 43 is provided between the outer conductor portions 41a and the inner conductor portions 42a. A second insulating plate 44 is provided between the inner conductor portions 42a and the axial end surface of the core 30.

Figure 3B:
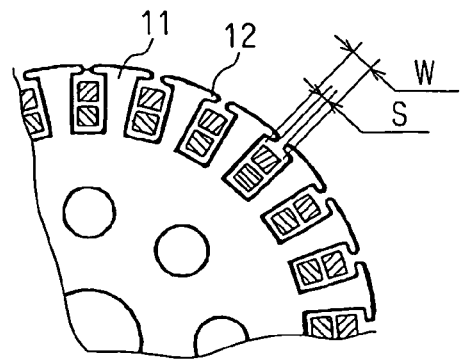
FIG. 3B is a schematic cross-sectional view of a rotor core on which conductors are mounted according to the first embodiment of the present invention.

Accordingly, the upper conductor 41 and the outer conductor portions 41a form a substantially U-shaped conductor, and the lower conductor portion 42 and the inner conductor portions 42a form a substantially U-shaped conductor. The U-shaped conductors are mounted on the core 30 such that the rotor core 30 is sandwiched by the outer and inner conductor portions 41a, 42a in the axial direction. After the U-shaped conductors are mounted to the core 30, the nails 12 formed at the ends of the teeth 11 are bend in the radially inward direction to restrict the conductors 41, 42 from coming out from the slots or expanding in the radially outward direction, as shown in FIG. 3B. Here, the nails 12 have dimensions such that a distance S between the nail 12 of a first tooth 11 and the nail 12 of an adjacent second tooth 11 is smaller than a circumferential width W of the conductor 41, 42 mounted between the first tooth 11 and the second tooth 11, in a condition where the nails 12 are bend.

Figure 5:
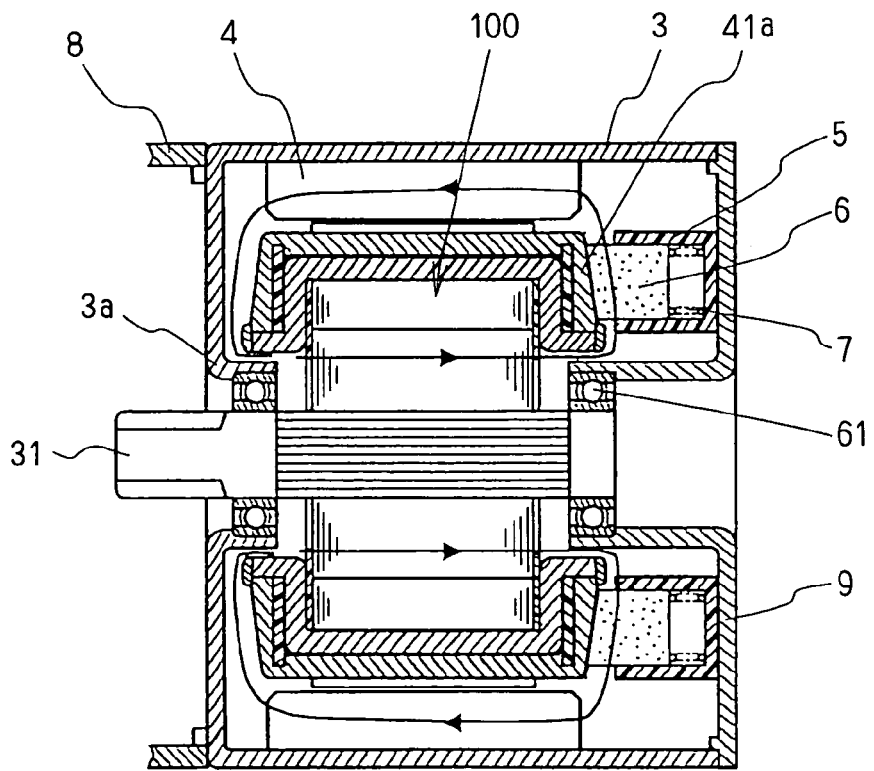
FIG. 5 is a schematic cross-sectional view of a rotary electric machine having the rotor shown in FIG. 4.

The rotor 100 shown in FIG. 4 is employed to a permanent-magnet rotary electric machine shown in FIG. 5. In an inner periphery of a yoke 3, which is in a form of substantially bottomed cylinder, magnetic poles formed of permanent magnets are arranged. The rotor shaft 31 is held between a front end 3a of the yoke 3 and an end plate 9 through bearings 61. Brushes 6 are slidably held in brush holders 5 fixed to the inside surface of the end plate 9. The brushes 6 are biased toward the axial end face of the outer conductor portions 41a of the rotor 100 by springs 7 housed inside the brush holders 6. The yoke 3 connects to a fixing housing 8, which is partly illustrated in FIG. 5. When the rotor 100 rotates, air circulates in the rotary electric machine as denoted by arrows in FIG. 5.

(Second Embodiment)

Figure 6:
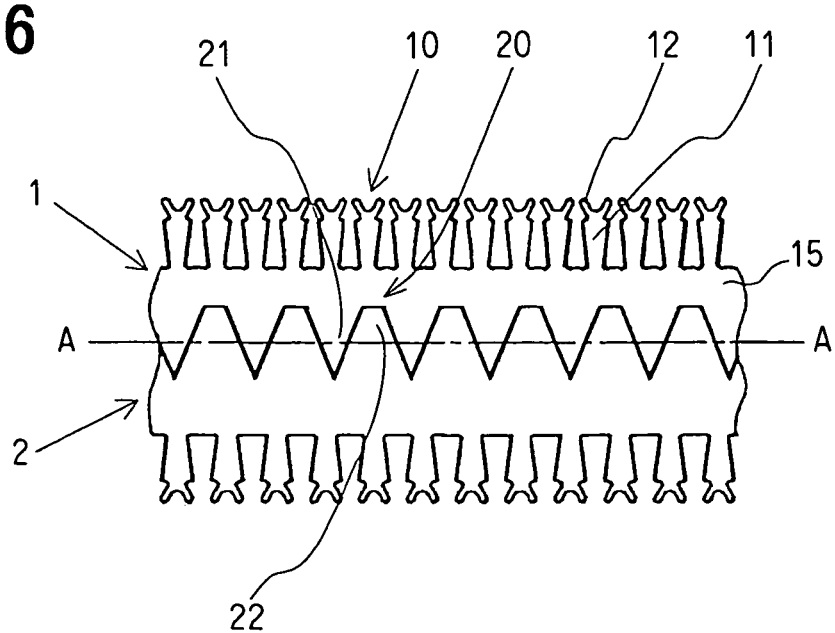
FIG. 6 is a plan view of a base sheet for a rotor core according to a second embodiment of the present invention.

FIG. 6 shows the base sheet 10 of the second embodiment. In the second embodiment, the shapes of the projections 21 and the recesses 22 of the fixing projection and recess portions 20 are different from those of the first embodiment shown in FIG. 1.

Specifically, the shapes or areas of the projections 21 and the recesses 22 are different with respect to the centerline A—A between a first line passing through the tops of the projections 21 and a second line passing through the bottoms of the recesses 22. The shapes of the intermeshed portions 20 are different between the two material sheets 1, 2.

In the second embodiment, two material sheets 1, 2 having different shapes are produced from the single base sheet 10 at the same time.

(Third Embodiment)

Figure 7:
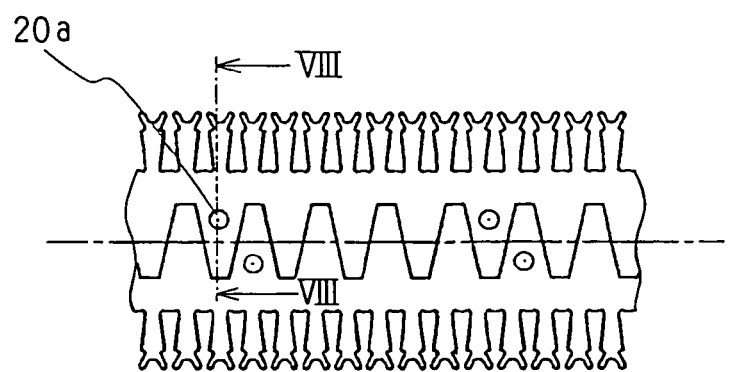
FIG. 7 is a plan view of a base sheet for a rotor core according to a third embodiment of the present invention.
Figure 8:
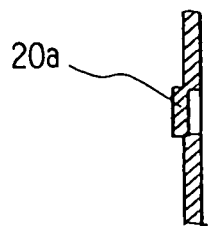
FIG. 8 is a cross-sectional view of a material sheet of the base sheet shown in FIG. 7 taken along a line VIII—VIII.
Figure 9:
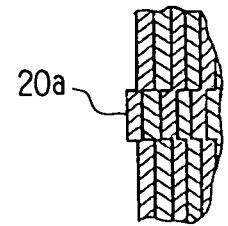
FIG. 9 is a partial cross-sectional view of a rotor core manufactured by helically winding the material sheet shown in FIG. 7.
Figure 10:
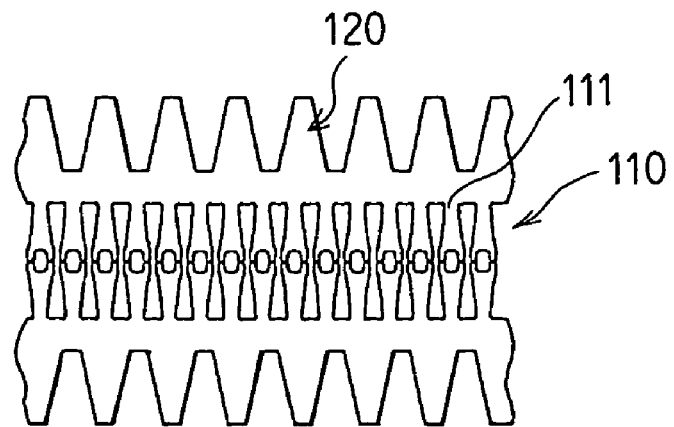
FIG. 10 is a plan view of a base sheet of a related art.
Figure 11:
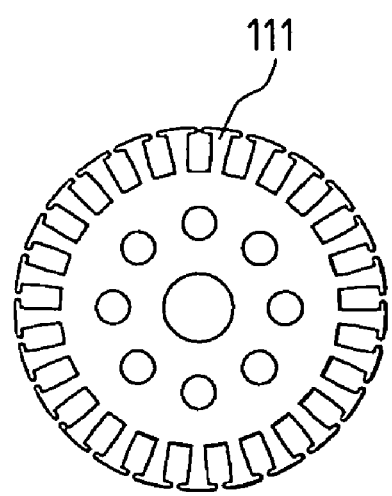
FIG. 11 is an end view of a rotor core of a related art.

FIGS. 7 to 9 show the third embodiment of the present invention. In the third embodiment, each material sheet 1, 2 has engaging means such as stamped projections 20a. The engaging means are used for engaging or associating sheet segments after the material sheet 1, 2 is helically wound.

The stamped projection 20a is embossed by half-shearing the material sheet 1, 2 in a direction that a thickness of the sheet is measured, as shown in FIG. 8. The projections 20a are formed within the projections 21, not in the connecting portion 15. When the material sheet 1, 2 is helically wound, the stamped projections 20a overlap and engage one another between the sheet segments, which are layered in the axial direction and engage, as shown in FIG. 9.

According to the first to third embodiments, the material sheets 1, 2 are arranged in the base sheet 10 such that the fixing projection and recess portions 20 are opposed and intermeshed with each other. Therefore, a yield rate is increased higher than a base sheet in which the material sheets are arranged such that teeth thereof are opposed. In the base sheet in which the teeth are opposed between the material sheets, a yield rate is 60%. On the other hand, in the base sheet 10 of the first and second embodiments, the yield rate is increased to 80%. Further, when the projections 21 of the two material sheets 1, 2 are formed to completely mate, a yield at the intermeshed portions is 100%. By this, the yield rate is further improved.

The projection and recess portions 20 can have different shapes in two material sheets 1, 2, as in the second embodiment. In this case, two rotors having different specifications or characteristics can be produced at the same time with a high yield rate. Accordingly, the production efficiency is improved in producing multiple types or models of rotors.

In addition, it is well known that the shape of core is different according to a winding specification of the rotary electric machine. For example, in a rotor in which a pair of upper and lower conductors is mounted in the slot so called in a single turn-type rotor, the teeth are low. When a rotor core for such rotor is produced by helically winding the material sheet, since the dimension of the connecting portion is relatively large, it is difficult to helically wind such material sheet. To solve this problem, it is required to increase a diameter of the rotor shaft.

On the other hand, in the embodiments, the teeth 11, the projections 21 and the connecting portion 15 are formed such that the height H of the teeth 11 is equal to or less than the half dimension T of the projection 21 and the connecting portion 15 (2×H≦T). Accordingly, the material sheet 1, 2 can be easily wound without requiring the increase in the diameter of the rotor shaft 31.

In the embodiments, the material sheets 1, 2 are formed such that the teeth 11 are located at the sides of the base sheet 10. That is, the teeth 11 extend to the outside of the base sheet 10. If the nails 12 are formed to extend straight from the teeth 11, the yield rate at the sides of the base sheet 10 is reduced. On the other hand, in the embodiment, the nails 12 are formed to extend substantially V-shapes. That is, the nails 12 are inclined with respect to the radial line of the core 30. Accordingly, the dimension of the nails 12 are reduced in the radial direction, as compared with the straight nails. Therefore, the width of the base sheet 10 can be reduced. Accordingly, the yield rate at the nails 12 is improved. Furthermore, the nails 12 are bend after the conductors are fixed in the slots. Because the nails 12 are formed to extend in the radially outward direction, it is possible to ensure a required length and strength.

In a conventional core, to ensure a sufficient strength as the core, the helically wound sheet is held by a jig after helically wound, and then the layered sheet segments are fixed by such as welding throughout the layered sheet segments. However, in the helically wound rotor core, since the curvature of the winding is smaller than that of the stator core, a returning force due to spring back force is largely generated in the material sheet. Therefore, the layered sheet segments are easily displaced when holding by the jig. If the sheet segments are largely displaced, it is likely to be difficult to mounted the conductors on the core. In the embodiments, however, the substantially U-shaped conductors 41, 42 are mounted such that the core 30 is sandwiched in the axial direction. Therefore, the layered sheet segments of the core are not easily separated in the axial direction. As a result, the displacement of the sheet segments is reduced.

Further as in the third embodiment, the stamped projections 20a are formed on the material sheets 1, 2 as the engaging means. Thus, the sheet segments are engaged in the direction that the sheet segments are layered while the material sheet 1, 2 is helically wound. Accordingly, the sheet segments can be further securely fixed.

If the engaging projections 20a are formed in the connecting portion 15 in which the magnetic paths are formed, the engaging projections 20a are likely to be deformed when the material sheet 1, 2 is helically wound. As a result, it is difficult to engage between the sheet segments. In the embodiments, since the engaging projections 20a are formed within the projections 21, it is less likely that the engaging projections 20a will be deformed. Therefore, the sheet segments are easily engaged. With this, the displacement of the sheet segments is reduced.

Further, since the U-shaped conductors 41, 42 are mounted such that the rotor core 30 is sandwiched in the axial direction, the strength of the core 30 can be increased without using additional fixing means for securing the helically wound material sheets. Also, in the core 30, the projections 21 forms gaps 23 between them. The gaps 23 define air passages during the rotation of the rotor 100. Accordingly, the cooling efficiency of the rotary electric machine is enhanced.

In the magnet-type rotary electric machine, the number of slots is larger and the amount of the magnetic paths is smaller than those of the winding-type rotary electric machine. Thus, when the present invention is employed to the magnet-type rotary electric machine, the feature of helical winding of the present invention adapts to the features of the magnet-type rotary electric machine. Further, the width of the connecting portion 15 is reduced. Accordingly, the rotor core 30 is produced at low costs and the material sheet 1, 2 is easily wound with a less force. Further, the yield rate is highly improved.

The present invention is not limited to the above embodiments, but may be implemented in other ways without departing from the spirit of the invention.

What is claimed is:

1. A rotor for a rotary electric machine, comprising:
   a rotor core constructed of a helically wound material sheet, wherein the material sheet is in a form of substantially belt and has a plurality of teeth extending from a first side of its middle portion and a plurality of projections projecting from a second side of the middle portion in a direction opposite to the teeth, the projections define recesses therebetween,
   each projection and each recess have substantially the same dimension with respect to a centerline between a first line passing through tops of the projections and a second line passing through bottoms of the recesses, and
   the material sheet is helically wound such that the projections are located at an inner diameter side of the rotor core,
   wherein a dimension (H) of the teeth and a dimension (T) of the connecting portion and the projections with respect to a direction perpendicular to the longitudinal direction of the material sheet satisfy a relation $2 \times H \leq T$.

2. The rotor according to claim 1, wherein the teeth have one of substantially trapezoidal shapes and substantially rectangular shapes.

3. The rotor according to claim 1, further comprising:
   a rotor shaft fixed in the inner diameter of the rotor core, wherein
   the projections of the material sheet forms arcs at the tops, the arcs having curvature substantially corresponding to a curvature of an outer circumference of the rotor shaft.

4. The rotor according to claim 1, further comprising:
   conductors mounted in slots defined between the teeth, wherein
   each of the teeth has nails projecting from its end in a substantially V-shape,
   each of the nails have a dimension such that a distance between the nail of a first tooth and the nail of an adjacent second tooth in a circumferential direction of the rotor core is smaller than a width of the conductor mounted in the slot between the first tooth and the second tooth in a condition that the nails are bent toward the circumferential direction.

5. The rotor according to claim 1, further comprising:
   an engaging means provided on the rotor core, wherein
   the engaging means is disposed to restrict separation of sheet segments of the helically wound material sheet.

6. The rotor according to claim 5, wherein the engaging means is integrally formed into the rotor core.

7. The rotor according to claim 5, wherein the engaging means is formed within the projections of the material sheet.

8. The rotor according to claim 1, further comprising:
   conductors mounted in slots defined between the teeth, wherein
   the conductors have substantially U-shapes and are mounted such that the rotor core is sandwiched in an axial direction.

9. The rotor according to claim 1, wherein the projections are located on an inner diameter side of the rotor core and defines gaps between them in a circumferential direction of the rotor core.

10. The rotor according to claim 1, wherein the rotor core is used for a permanent magnet rotary electric machine.

* * * * *